United States Patent

Foldes et al.

[15] 3,648,666
[45] Mar. 14, 1972

[54] STEAM BOILERS

[72] Inventors: Gabriel Francis Foldes, Banstead; Peter William Neve, Biggin Hill, both of England

[73] Assignee: Foster Wheeler Corporation, Livingston, N.J.

[22] Filed: Oct. 8, 1970

[21] Appl. No.: 79,233

[52] U.S. Cl. ............................................122/4 D, 110/28 J
[51] Int. Cl. ..........................................................F22b 1/02
[58] Field of Search....................................122/4 D; 110/28 J

[56] References Cited

UNITED STATES PATENTS

| | | | |
|---|---|---|---|
| 2,926,143 | 2/1960 | Leland | 122/4 D |
| 3,431,892 | 3/1969 | Godel | 122/4 D |

FOREIGN PATENTS OR APPLICATIONS

| | | | |
|---|---|---|---|
| B27505 | 10/1956 | Germany | 122/4 D |

Primary Examiner—Kenneth W. Sprague
Attorney—John Maier, III, Marvin A. Naigur and John E. Wilson

[57] ABSTRACT

This invention relates to steam boilers which are fired by a fluidized bed burner. Immersed within the bed are at least part of the evaporating section and at least part of the superheating section of the boiler. The tubes constituting these parts of the evaporating and superheating sections are arranged so that there are alternate evaporating and superheating tubes at least in one direction across the cross section of the bed. This ensures that the bed has an even temperature and avoids small hot spots within the bed where fusion of ash particles can occur. According to a preferred subsidiary feature of the invention, the evaporating tubes extend the full height of the bed while the superheating tubes are only positioned above the static bed height. Then when the bed is shut down by stopping the supply of fluidizing air, the hot bed particles do not contact the superheating tubes.

11 Claims, 4 Drawing Figures

Patented March 14, 1972

Inventor

By

Attorney

STEAM BOILERS

BACKGROUND OF THE INVENTION

The fluidized bed of a fluidized bed burner will normally comprise a loose bed of particles, most of which are ash particles and a few of which are coal particles, supported by a flow of combustion air which flows through the bed at sufficient velocity to support the particles. In practice the fluidized bed of particles behaves in a similar way to a boiling turbulent liquid. The coal particles burn in the air and, to support combustion, fresh coal particles are continuously added while, to maintain a substantially constant bed height, an overflow of particles is continuously withdrawn.

The heat produced by the burner can be used to produce steam in various ways. Preferably, however, steam raising and steam superheating tubes are immersed in the bed so as to exploit the very high heat transfer rates which can be achieved between the bed and the tubes. This arrangement also assists in cooling of the bed so as to prevent the ash particles reaching their fusion temperature because if this occurs this can make fluidization impractical and can also cause slag deposits on the tubes which may lead to their burn-out.

It is, therefore, important to maintain even temperatures within the bed so as to avoid the formation of any hot pockets in the bed, and the invention is concerned with this problem.

THE INVENTION

According to the invention there is provided a fluidized bed steam boiler having an evaporating section and a steam superheating section, at least part of the evaporating section consisting of evaporating tubes immersed within the fluidized bed and at least part of the superheating section consisting of superheating tubes immersed within the bed, the arrangement of the evaporating and superheating tubes immersed within the bed being such that evaporating and superheating tubes alternate at least in one direction across the cross section of the bed.

This arrangement has the advantage of ensuring even cooling of the bed so as to give even bed temperatures. This, of course, reduces or eliminates the existence of small hot spots within the bed and so one can ensure that the ash particles are kept below their fusion temperature.

Some or all of the superheating tubes can, of course, be replaced by steam reheating tubes if a reheater section is provided. Therefore, as used herein the terms superheat section and superheating tubes are intended to include reference to a reheating section and a reheater tube, respectively, unless the context specifically requires otherwise.

An advantage of arranging some evaporating and superheating tubes within the fluidized bed in accordance with the invention is that all the superheating tubes can be positioned above the static bed height. Therefore according to another aspect of the invention there is provided a fluidized bed steam boiler having an evaporating section and a steam superheating section, at least part of the evaporating section consisting of evaporating tubes immersed within the fluidized bed and at least part of the superheating section (as defined above) consisting of superheating tubes (as defined above) immersed within the fluidized bed, the evaporating tubes being distributed throughout the whole height of the fluidized bed while the superheating tubes being distributed so that they are all positioned above the static bed height.

The positioning of the superheater tubes has a number of advantages. There are relatively few tubes in the lower part of the bed and so this eliminates the problem of quenching the bed during lighting up, thereby assisting a quick start-up of the boiler. Also, if the boiler has to be shut down quickly, the superheating tubes are protected from the residual heat of the particles of the bed when these particles suddenly collapse after stopping the fluidizing air supply.

The whole of the superheater and any reheater can be positioned within the fluidized bed. Preferably, however, the superheater and any reheater comprise primary and secondary parts, the primary parts consisting of tubes immersed within the bed while the secondary parts consist of banks of tubes heated by the flow past them of the hot combustion products from the bed. This arrangement has the advantages that an accurate control of superheated steam temperatures is possible because a desuperheater can be provided between the primary and secondary parts, there is considerable flexibility in design, and the metal temperatures of the tubes of the final stages of the superheater can be kept much lower than would be the case if those tubes were immersed within the fluidized bed.

The arrangement of the invention can be applied to all fluidized beds irrespective of whether they are circular or rectangular in plan. In the case of circular beds, the evaporating and superheating tubes can conveniently be in the form of helical coils alternatively interleaved with one another, whereas in the case of a rectangular bed, the superheating and evaporating tubes can be zig-zagged in shape so as to give a number of horizontal tube runs one above another, alternate tubes being superheating tubes and evaporating tubes.

The wall or walls defining the bed can conveniently be made of tube or tube panels. These tubes will normally be water tubes carrying water for evaporation but some of the tubes can conveniently act as steam downcomers carrying steam to the primary part of the superheater. This assists in retaining a compact and economic design. In the case of a rectangular bed design, one or more walls can act as steam downcomers while for a circular bed design some or all of the tubes making up the wall can be used for this purpose.

In the case of a circular bed design with helical evaporating and superheating tubes, an inner circular wall of water tubes can be provided which constitutes an overflow for the fluidized particles to give a constant bed height.

The invention is applicable to fluidized bed boilers where the fluidizing air is at atmospheric pressure or at an elevated pressure.

According to one embodiment of the invention, the wall or walls defining the bed are enclosed within an outer cylindrical vessel which defines with the wall or walls of the bed, a passage for the supply of fluidizing air to the bed. This arrangement has the advantage that, where the fluidizing air is at an elevated pressure, the outer vessel has only to resist this pressure without being exposed to high temperatures, whereas the wall of the bed which is exposed to high temperatures is only subjected to the very small pressure differential of the pressure drop on passage through the air distributor and the bed.

BRIEF DESCRIPTION OF THE DRAWINGS

The invention will now be described, by way of example, with reference to the accompanying diagrammatic drawings, in which.

DESCRIPTION OF THE PREFERRED EMBODIMENTS

Figure 1:
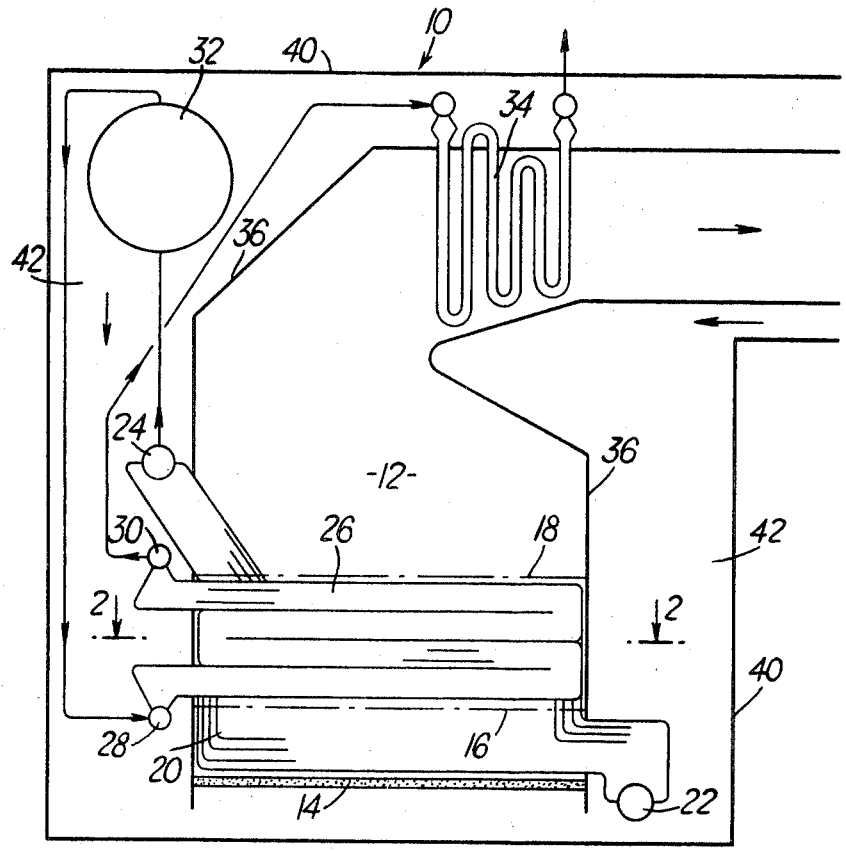
FIG. 1 is a sectional elevation of one form of fluidized bed boiler according to the invention.
Figure 2:
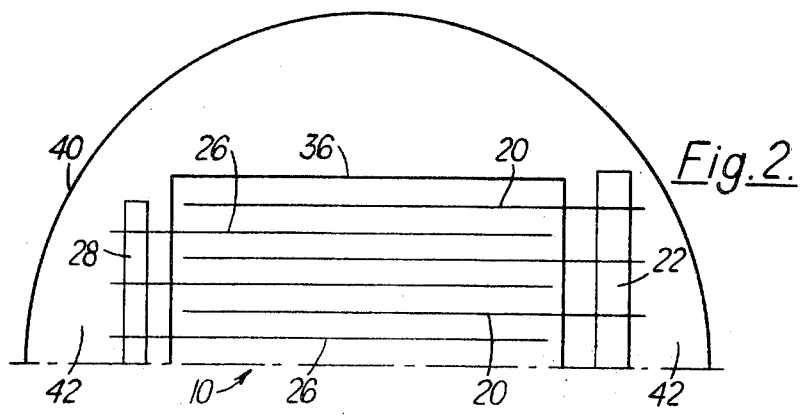
FIG. 2 is a half-section taken on the line 2—2 of FIG. 1.

The fluidized bed boiler 10 shown in FIGS. 1 and 2 comprises an inner rectangular chamber 12 in which the bed is defined. This inner chamber is closed at its base by a porous distribution plate 14 on which the bed particles are supported when the fluidizing air is shutoff. The static level of the particles when they are not being fluidized is shown at 16 while the normal level of the fluidized bed is shown at 18.

Immersed in the bed are a bank of evaporating tubes 20. These extend from an inlet header 22 to an outlet header 24 and are of zigzag shape with a number of straight horizontal lengths joined by U bends. As can be seen the tubes 20 extend from the base of the bed against the distribution plate to just below the normal level 18 of the bed when fluidized.

Also immersed in the bed are a bank of primary superheating tubes 26 which extend from an inlet header 28 to an outlet header 30. The tubes 26 are also of zig-zig shape similar to the tubes 20. The superheating tubes do not extend the full depth of the bed. Instead they extend from just above the static level 16 of the bed to just below the normal level 18. This arrangement has the advantage that there are relatively few tubes in the lower part of the bed so that this avoids the quenching of the bed during lighting up and also protects the superheating tubes 26 from the hot particles when the bed is shut down by stopping the supply of fluidizing air.

As best shown in FIG. 2 the superheating tubes 26 are interleaved between evaporating tubes so that as seen in plan the two types of tube alternate. This interleaving of the tubes assist in even heat removed from the bed and keeps the bed temperature substantially uniform so avoiding hot pockets where the ash particles might become tacky, cease to fluidized and stick to the tubes with risk of the dire consequences of a tube failure.

The steam and water mixture from the evaporating tubes 20 passes from the outlet header to a steam drum 32 where the steam and water are separated. The steam then passes to the superheating tubes inlet header 28. From this primary superheating section, the steam is then passed to a secondary superheating section 34 which is heated by the passage across it of the hot combustion products from the bed. If desired a desuperheater (not shown) can be provided between the two superheating sections so as to provide accurate final superheating temperatures. Also the advantage of heating the secondary section 34 by means of the hot gases from the bed instead of immersing it in the bed is that of avoiding very high metal temperatures for the tubes of the secondary section.

The boiler 10 can of course also be provided with economizer sections (not shown) and reheating sections (not shown). In the case of the latter, some of the superheating tubes in the bed will be replaced by primary reheating tubes, and additionally a secondary reheating section may be provided which is heated by the hot gases from the bed.

The chamber 12 is defined by walls 36. These can be walls of water tubes or tube panels. Also, for compactness and economy at least some of the tubes of these walls can act as downcomers for the passage of steam from the drum 32 to the superheating inlet header 28. An overflow from particles (not shown) to keep a constant bed level may be provided through the walls 36.

Surrounding the walls 36 is an outer cylindrical casing 40. This defines with the walls 36 a downcomer passage 42 for combustion air. The advantage of this arrangement is that, in the case of a bed operated with air at an elevated pressure, the outer casing 40 has only to withstand the elevated pressures and is not exposed to the high bed temperatures, whereas the walls 36, which are exposed to the high bed temperatures, do not have to withstand large pressure differentials.

Figure 3:
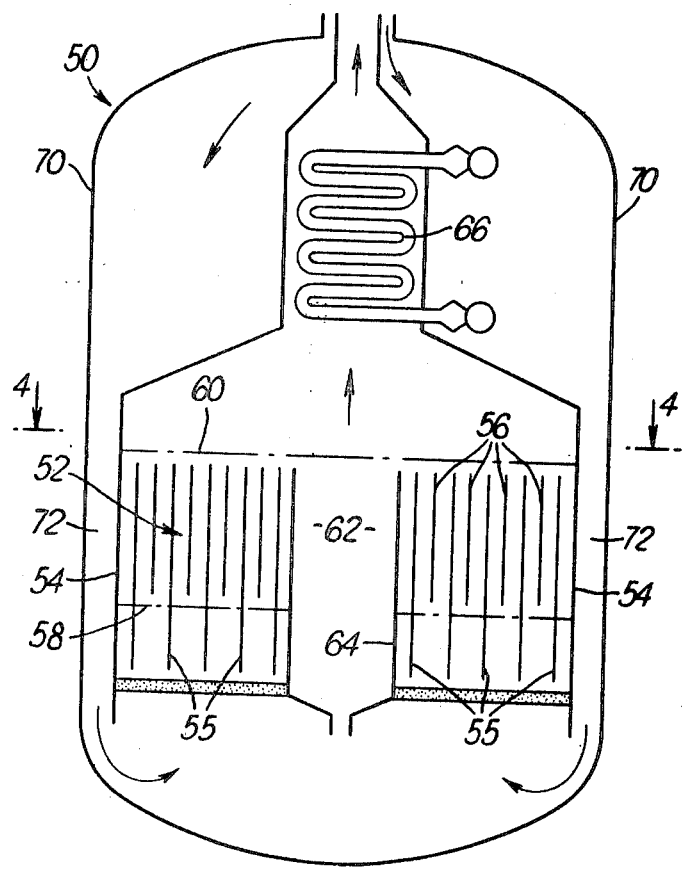
FIG. 3 is a sectional elevation of another form of fluidized bed boiler according to the invention.
Figure 4:
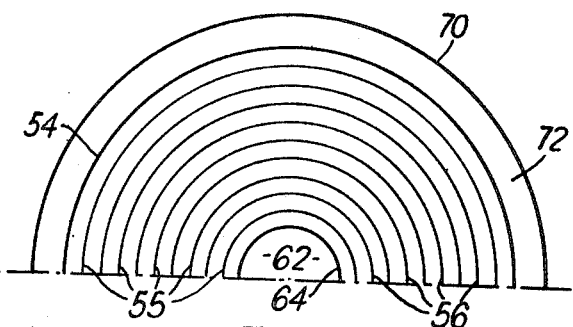
FIG. 4 is a half-section taken on the line 4—4 of FIG. 3.

The steam boiler 50 shown in FIGS. 3 and 4 is very similar to the boiler 10 shown in FIGS 1 and 2 except that the bed 52 is defined by a circular wall 54 and the evaporating tubes 55 and superheating tubes 56 are both helically coiled. The arrangement of the tubes is such that alternate helical tubes are evaporating tubes and superheating tubes and this has the advantages set out above of maintaining a uniform bed and preventing hot spots.

The static level of the bed is shown at 58 while the normal fluidized level is shown at 60. As can be seen the superheating tubes 56 do not extend below the static level 58 whereas the evaporating tubes 55 extend the full depth of the bed. Again this arrangement has the advantages set out above of preventing quenching of the bed during start-up and burning of the superheating tubes when the bed is shut down.

With this circular arrangement of bed and tubes, a central overflow 62 can be provided. This is defined by a cylindrical wall 64 of water tubes. The advantage of such a central overflow is again one of uniformity of the bed.

As described above in connection with the boiler 10, at least some of the tubes constituting the wall 54 can act as steam downcomers for the passage of steam from a drum (not shown) to the superheating tubes 56.

As also described in connection with the boiler 10, a secondary superheating section 66 can be provided which is heated by the hot gases from the bed. This arrangement has of course the advantages set out above in connection with the boiler 10.

Although not shown, economizer sections may be provided for removing heat from the gases leaving the superheating section 66. Also a reheater may be provided in which some of the superheating tubes 56 can be replaced by reheating tubes and a final reheating section similar to the superheating section 66 can be provided.

The boiler 50 can of course be operated with this fluidizing gas at atmospheric pressure or at elevated pressures.

As described in connection with the boiler 10, the wall 54 can be enclosed within an outer cylindrical vessel 70 which defines a downcomer passage 72 for the air supply to the bed. This arrangement has, of course, the advantage that the vessel 70 can be designed to withstand the elevated pressures when the bed is operated at elevated pressure while the wall 54 can be designed to withstand the high bed temperatures.

Although the words water and steam have been used herein, they are to be understood as including reference to any suitable liquid and its vapor unless the context specifically requires otherwise.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

We claim:

1. A fluidized bed steam boiler comprising a fluidizable bed of combustible particles, means for supplying air to fluidize said particles whereby combustion of said combustible particles occurs, means for supplying fresh combustible particles to said bed and withdrawing spent particles, said boiler comprising evaporating tubes in which water is evaporated, at least some of said evaporating tubes being immersed within said bed of particles when fluidized, and superheating tubes in which said steam is superheated, at least some of said superheating tubes being immersed within said bed of particles when fluidized, the arrangement of said evaporating and superheating tubes immersed within said bed when fluidized being such that evaporating and superheating tubes alternate at least in one direction across the cross-section of said bed.

2. A boiler according to claim 1 in which said evaporating tubes immersed within said bed when fluidized are distributed throughout the whole height of the fluidized bed while said superheating tubes immersed within said bed when fluidized are distributed so that they are all positioned above the static height of said particles when said supply of fluidizing air is shut off.

3. A boiler according to claim 1 in which some of said superheating tubes are immersed within said bed when fluidized while others of said superheating tubes are arranged to be heated by being swept by hot gases from said bed, said superheating tubes immersed within said bed when fluidized constituting a primary part of said superheater while said other superheating tubes constituting a secondary part of said superheater.

4. A boiler according to claim 3 further comprising a desuperheater provided between said primary and secondary parts of said superheater.

5. A boiler according to claim 1 in which said bed is rectangular in plan and said superheating and evaporating tubes immersed in said bed when fluidized alternate in one direction across said bed.

6. A boiler according to claim 5 in which each of said superheating and evaporating tubes comprise a number of substantially horizontal runs positioned one above the other, curved end portions joining said horizontal runs in series so that each of said tubes is of upright zig-zag shape.

7. A boiler according to claim 1 in which said bed is circular in plan and said superheating and evaporating tubes immersed within said bed when fluidized are in the form of helical coils alternatively interleaved with one another.

8. A boiler according to claim 7 further comprising an inner cylindrical wall of water tubes positioned axially of said bed defining an open-topped overflow for spent particles from said bed.

9. A boiler according to claim 1 further comprising wall means defining said bed, said wall means including tube panels and some of said tubes of said tube panels being arranged to act as steam downcomers for conducting steam to said superheating tubes immersed within said bed.

10. A boiler according to claim 1 further comprising wall means defining said bed and an outer upright cylindrical vessel surrounding said wall means, said vessel and said wall means defining between themselves at least one passage for the supply of fluidizing air to said bed.

11. A fluidized bed steam boiler comprising:
a. a fluidizable bed of combustible particles;
b. wall means defining a bed for said particles;
c. means for supplying combustion air to fluidize said particles in said bed defined by said wall means, whereby combustion of said combustible particles occurs to give spent ash particles;
d. means for supplying fresh combustible particles to said bed;
e. means for withdrawing spent ash particles from said bed;
f. evaporating tubes in which water is evaporated, at least some of said evaporating tubes being immersed within said bed throughout the whole height of said bed,
g. a section arranged for heating the steam resulting from the evaporation of said water, said section being chosen from the group consisting of superheating, reheating, and a mixture of superheating and reheating tubes,
h. said section arranged for heating steam comprising a primary section and a secondary section, said primary section comprising steam tubes positioned so as to be immersed within said bed when fluidized and clear of said particles when said supply of fluidizing air is shut off, and said secondary section comprising steam tubes arranged to be heated by being swept by hot gas from said bed, the arrangement of said evaporating tubes and steam tubes immersed within said bed when fluidized being such that bed evaporating and steam tubes alternate at least in one direction across the cross-section of said bed.

\* \* \* \* \*